United States Patent [19]

Mann

[11] Patent Number: 4,597,655
[45] Date of Patent: Jul. 1, 1986

[54] CAMERA WITH MOVABLE FILM PACK AND ROTATABLE LENS FOR SEQUENTIAL EXPOSURES AND PHOTO IDENTIFICATION SYSTEM

[75] Inventor: Arthur S. Mann, Jupiter, Fla.

[73] Assignee: Identrol, Miami, Fla.

[21] Appl. No.: 730,062

[22] Filed: May 3, 1985

[51] Int. Cl.$^4$ .................. G03B 1/00; G03B 17/18; G03B 17/24

[52] U.S. Cl. .................. 354/121; 354/105; 354/123; 354/289.1

[58] Field of Search .............. 354/105, 106, 120, 121, 354/123, 289.1

[56] References Cited

U.S. PATENT DOCUMENTS

| | | | |
|---|---|---|---|
| 4,240,729 | 12/1980 | Barney | 354/123 X |
| 4,540,259 | 9/1985 | Blakely et al. | 354/120 X |

Primary Examiner—Michael L. Gellner

[57] ABSTRACT

An automatic or manually operated camera and photo-identification card system for virtually foolproof association of an individual photograph with its appropriate identification card. Multiple images are produced on a film element by rotating a lens into predetermined angular locations or moving the film element to predetermined positions, lens rotation and film element movement being sequenced in a predetermined manner. The camera, in both the automatic and manual embodiments, includes both a built-in strobe and a subject aiming light. A film element support plate has apertures, each having identifying indicia therein transferred to the film element upon exposure for ready association with an identificaiton card which is complete except for an identifying photograph.

17 Claims, 18 Drawing Figures

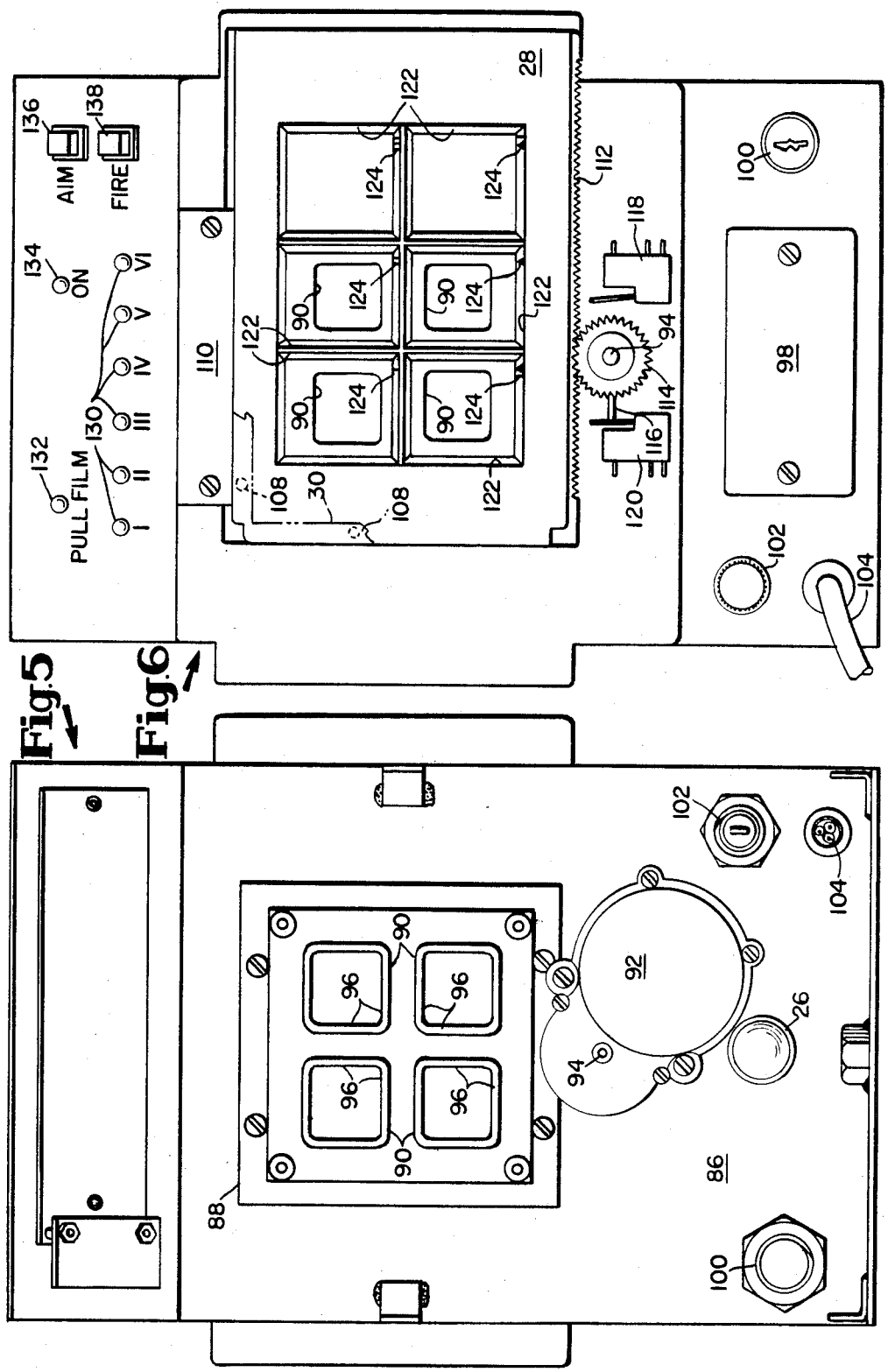

Fig. 7
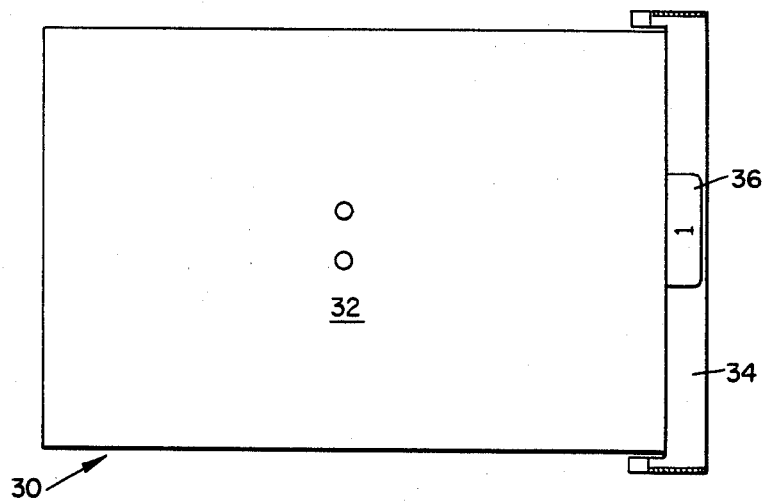
Fig. 8
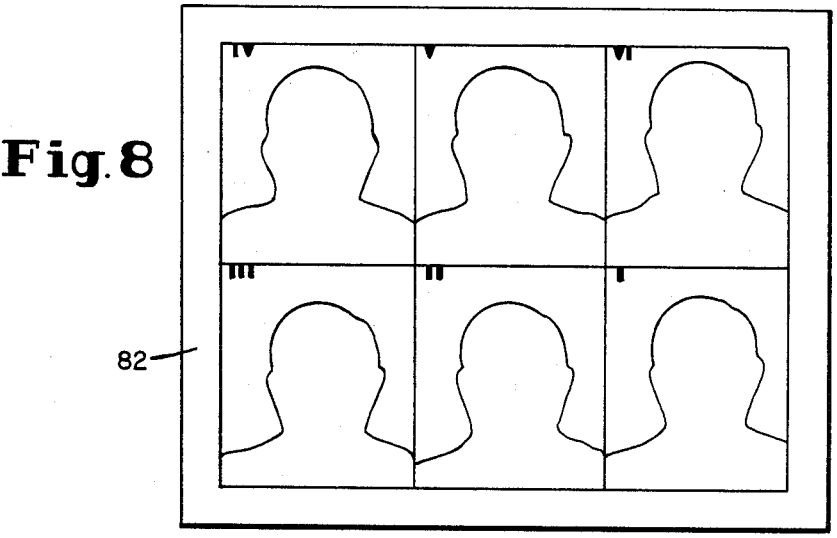
Fig. 9

CAMERA WITH MOVABLE FILM PACK AND ROTATABLE LENS FOR SEQUENTIAL EXPOSURES AND PHOTO IDENTIFICATION SYSTEM

BACKGROUND OF THE INVENTION

This invention concerns cameras in general and, more specifically, cameras for photo identification purposes wherein both a rotatable lens and a movable film plate are provided, which are moved in a predetermined sequence to expose separate but adjacent portions of a film element.

Cameras for sequentially exposing predetermined areas of a sensitized film are not new, per se. However, relevant prior art cameras do not have a combined rotating lens turret and a movable sensitized film plate structure which is easily operated to produce multiple exposed areas on each sheet of sensitized film. Furthermore, prior art cameras do not have an uncomplicated structure and system for assuring ready association of an exposed picture of a subject with a photo identification card, which is complete save for association of the proper picture with the card.

The following ten prior patents are illustrative of developments in the art to date. U.S. Pat. No. 3,503,317 issued to Clayton G. Johnson on Mar. 31, 1970, shows a six-frame format camera with a fixed film element and a lens movable sequentially over the six-frame areas of the film. However, parallax cannot be maintained, particularly with respect to the farthest separated individual frames. Also, the film pack is not movable. A similar system with similar parallax problems is disclosed in U.S. Pat. No. 4,067,025 issued to Otto T. Nebel et al on Jan. 3, 1978. This patent illustrates an endoscopic photographic system with a fixed film element and a nine-frame format apparatus, the lens only being sequentially movable over the film element. U.S. Pat. No. 4,140,381 issued to Lawrance M. Douglas on Feb. 20, 1979, discloses a camera with a lens movable from a central, full frame format to an offset, off axis position so that four smaller photographs may be taken on the same film sheet by rotation of the lens through 90° arcs. However, although parallax problems are virtually solved, the film sheet support is not movable and thus the camera is limited to a four-frame format.

Other prior art cameras disclose systems in which the film is shifted to provide multiple images on the same sheet but the lens remains fixed. My own prior U.S. Pat. No. 3,667,364 issued June 6, 1972, discloses such a system with the film pack being movable in a predetermined sequence to provide, for example, nine exposures on a single sheet of film (FIG. 6). U.S. Pat. No. 3,726,198 issued to Albion P. Bjork et al on Apr. 10, 1973 (and a Division of this patent. (U.S. Pat. No. 3,748,987) discloses a camera arrangement with a movable film pack and a fixed lens for producing two identification cards on each sheet of film.

Still other relevant prior art cameras employ twin lenses and shifting film pack to produce multiple sequential exposures on each sheet of film. Examples of such cameras are found in U.S. Pat. Nos. 3,796,485 issued to Myron A. Seiden on Mar. 12, 1974 and 4,270,855 issued to Lawrence M. Douglas on June 2, 1981. A major difficulty with such cameras is the extra expense mandated by the provision of two lenses.

A camera system utilizing both a movable film pack and a rotatable lens for exposure of two identification cards on each sheet of film is shown in U.S. Pat. No. 3,650,186 issued Mar. 21, 1972 to Lionel L. Stelck. After the subject's picture is taken, a data card holder 30 is lifted, thus shifting the lens, and the data card is photographed. Means for different light levels for photographing the subject and data card must be provided and two exposures are needed to produce each identification card. Thus, this patent does not teach sequential exposure of areas of a single film sheet using a program of alternative lens rotation and film pack shifting.

U.S. Pat. No. 4,285,587 issued Aug. 25, 1981 to Otto M. Schiff et al discloses an oscilloscope with a folded path optical system movable transversely and a four, six or nine image array film movable transversely with respect to the optical path to produce sequential multiple images on a sheet of film. However, in this case, the subject or oscilloscope image must travel with the optical path and lens for the system to be functional. Thus, although the invention is quite useful in the medical arts, it has little application in the part of producing photographs for identification cards.

SUMMARY OF THE INVENTION

Accordingly, it is a principal object of the invention to provide a camera and photo identification card system wherein the camera lens is rotatable and a film support plate is transversely movable to produce multiple sequential images on a single sheet of film.

It is another object of the invention to provide a camera and photo identification card system wherein both the lens and film support plate are motor driven and operable in a predetermined manner from a single switch to either rotate the lens or transversely shift a sheet of film to produce multiple, sequential images on a single sheet of film.

It is a further object of the invention to provide a camera and photo identification card system having a rotatable lens and a shiftable film support plate, both the lens and plate being manually moved, but not simultaneously, in a predetermined sequence to produce multiple, sequential images on a single sheet of film.

Still another object of the invention is to provide a camera and photo identification card system, the camera having a rotatable lens and a shiftable film support plate, the film support plate having multiple apertures, each aperture having identifying indicia whereby multiple, sequential exposures are produced on a single sheet of film, each exposure having unobtrusive but readily visually perceivable identifying indicia thereon.

Still a further object of the invention is to provide a camera and a photo identification card system, the camera having a rotatable lens and a shiftable film support plate to produce multiple sequential exposures on a single sheet of film, the film support plate having indicia transferrable to a sheet of film, there further being a plurality of blank identification cards having similar indicia thereon matching the support plate indicia whereby a camera operator may properly associate each exposure with a corresponding identification card.

Yet another object of the invention is to provide a camera and photo identification card system for producing multiple sequential images on a single sheet of film which is easily operated, the camera including internal operating and latching mechanisms to prevent a double exposure of any selected exposure area of a single sheet of film.

Another object of the invention is to provide a camera and photo identification card system for providing multiple sequential images on a single sheet of film, the camera including an aiming light producing a pencil beam light ray for assistance in properly aligning a subject with the camera lens and a strobe light for illuminating the subject as the shutter lens is tripped to take a picture of the subject.

Further novel features and other objects and advantages of this invention will become readily apparent from the following detailed description, discussion and the appended claims taken in conjunction with the accompanying drawings.

BRIEF DESCRIPTION OF THE DRAWINGS

Preferred structural embodiments of this invention are disclosed in the accompanying drawings in which:

FIG. 5 is an elevation view of the inside of the back plate or cover of the camera illustrated in FIG. 1;

FIG. 6 is an elevation view of the rear of the back plate or cover of the camera illustrated in FIG. 1 with parts removed to show underlying structure;

FIG. 7 is a plan view of a film container back mounted on the rear of the back plate or cover of both embodiments of the invention;

FIG. 8 is a plan view of a six format picture taken on a single sheet of film with both of the embodiments of the invention shown in the figures;

FIG. 9 is a plan view of an incomplete photo identification card used with the invention;

DESCRIPTION OF THE PREFERRED EMBODIMENT

Figure 1:
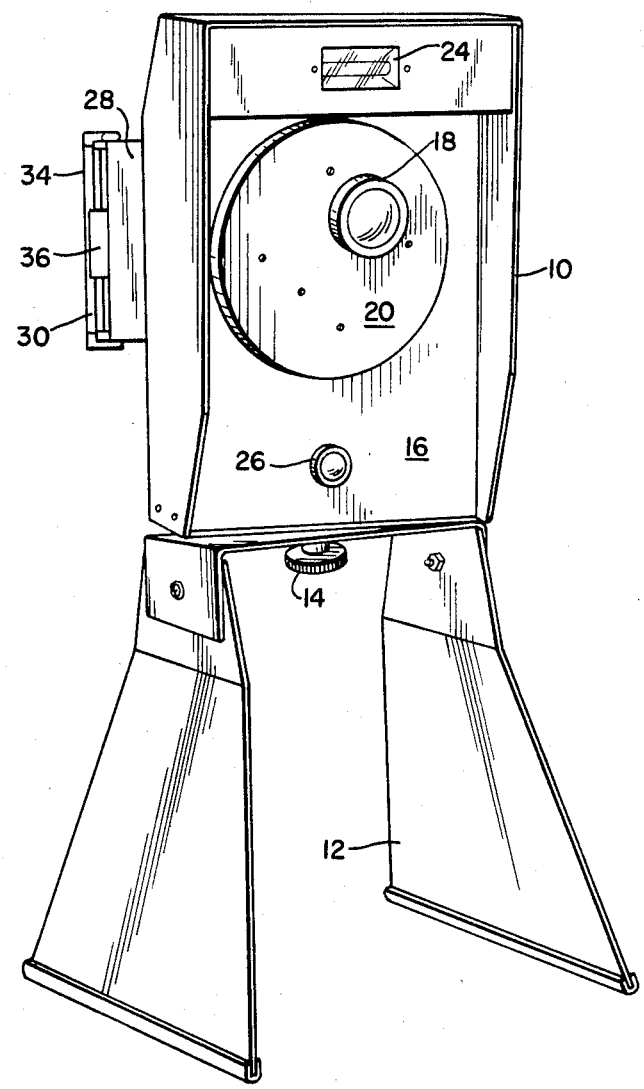
FIG. 1 is a perspective view of a fully automatic embodiment of the invention.

Referring now to the drawings by reference character, FIGS. 1-6 illustrate a fully automatic embodiment of the invention and FIGS. 10-18 disclose a manually operated embodiment of the invention. FIGS. 7-9 disclose film pack, a picture and identification card components employed with both embodiments of the invention.

Referring now to FIG. 1, the fully automatic embodiment of the invention includes a camera body 10 mounted on a support stand 12 and retained thereon by means of a thumb screw 14 threaded into the base of camera body 10. Any sort of support might be used in place of stand 12, such as a semiprofessional or professional tripod structure. Camera body 10 includes a front cover 16 upon which a lens 18 is affixed to a turret 20 which in turn is fixed to a rotatable support and indexing plate 22 (FIG. 3) which is rotatably mounted on front cover or plate 16. Camera body 10 further includes an internally mounted strobe 24 which is located centrally on a vertical plane drawn through the axis of rotation of lens turret 20 to eliminate vignetting in the pictures taken. An aiming light 26 is positioned beneath lens turret 20 and provides a pencil beam of light which is centered on the subject when a picture is taken, to assure that the subject is properly aligned with the camera. For example, the pencil beam may be aimed at a point on the forehead of a subject, between the eyes to center the subject's face with the lens. A film support plate, slidable laterally across the rear of the camera as will be further explained below, has a film holder 30 secured on the rear thereof. Preferably, film holder 30 (also shown in FIG. 7) is of a type manufactured by the Polaroid Corporation of Cambridge, Mass. and does not form a part of this invention per se. In the preferred embodiment, film holder 30 includes a door 32 and latch 34. A film cassette, also made by the Polaroid Corporation, is loaded into the holder and includes eight sheets of self-developing film. Each sheet of film includes an extension tab 36 which indicates which of the eight sheets of film is being exposed. Of course, the film cassette (not shown) is conventional and does not form a part of this invention, per se. These products of the Polaroid Corporation have been selected because of their widespread availability and acceptance and reliability in producing self-developing, clear images having an extended life.

Figure 2:
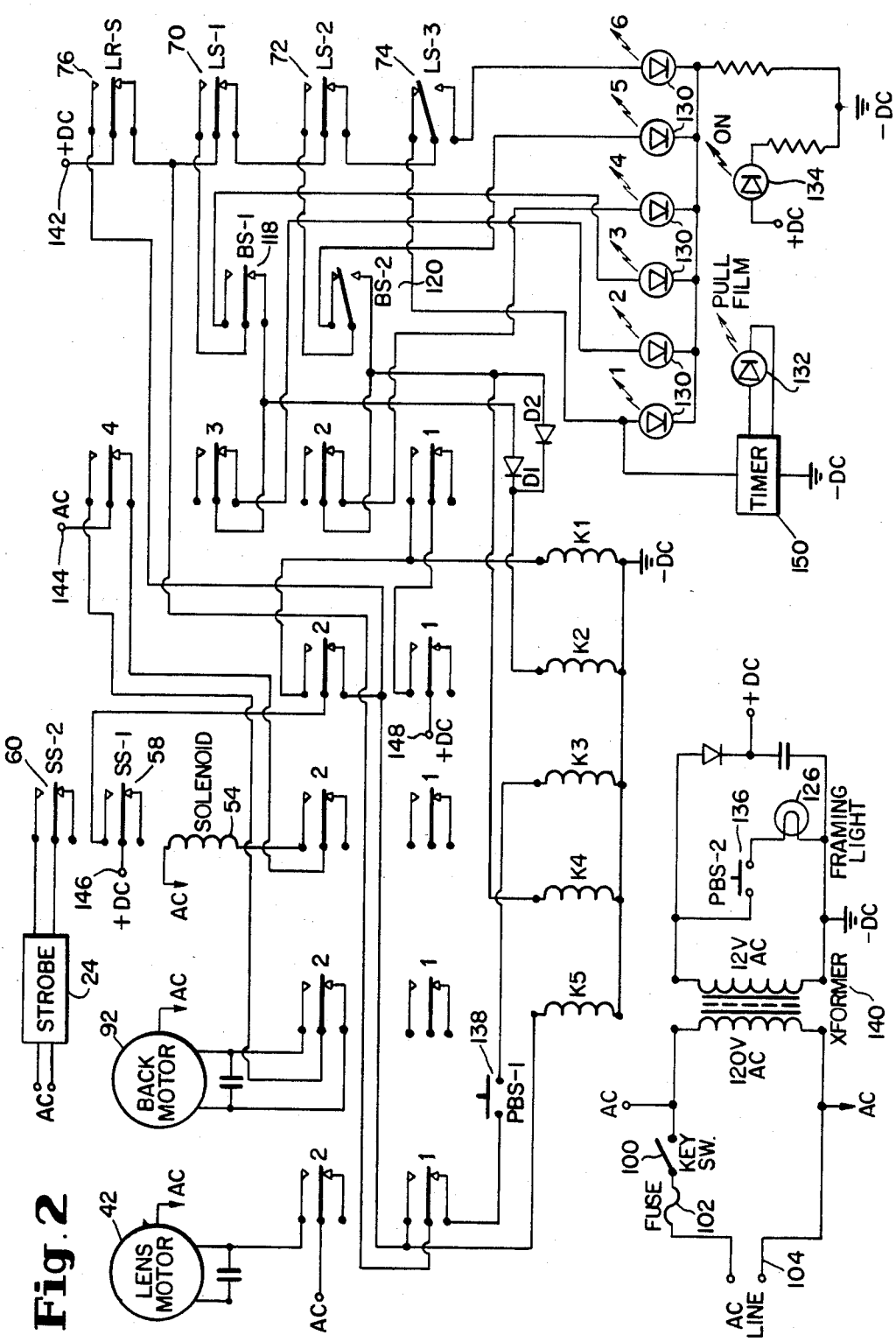
FIG. 2 is a wiring diagram of the electrical and electronic components of the embodiment illustrated in FIG. 1.
Figure 4:
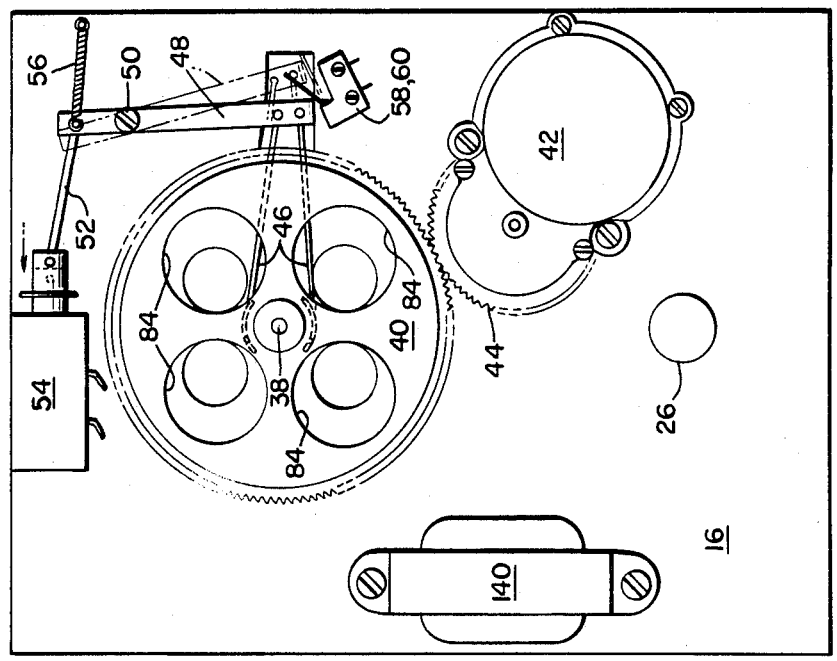
FIG. 4 is an elevation view of the rear of the front plate of the camera illustrated in FIG. 3.
Figure 3:
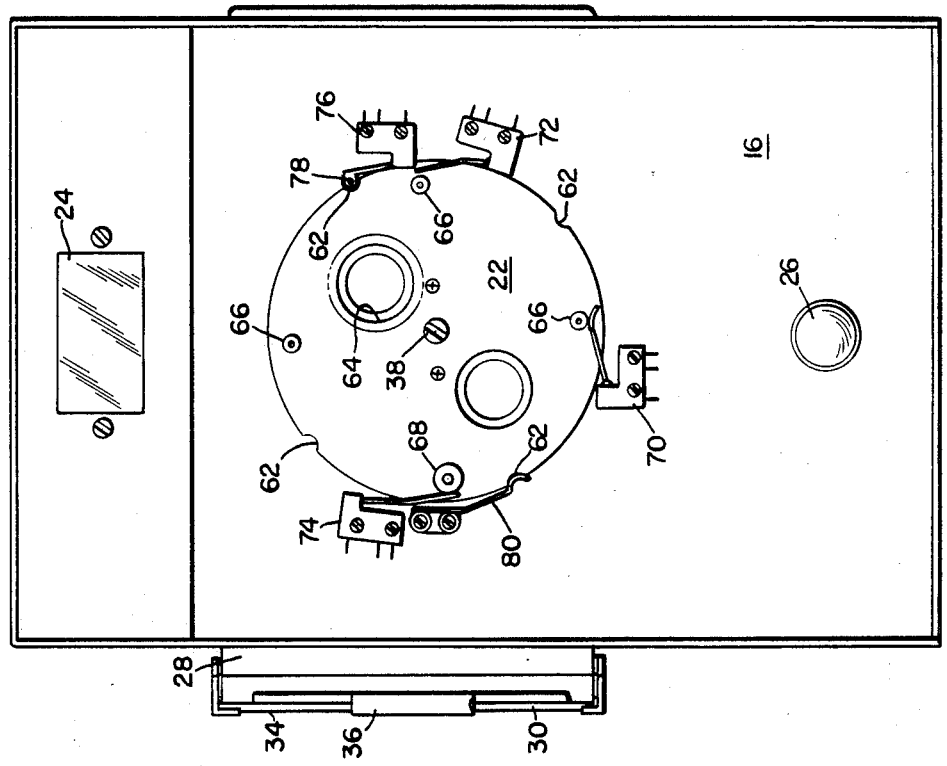
FIG. 3 is an elevation view of the front plate of the camera shown in FIG. 1 with the lens turret cover removed to reveal underlying components.

Referring now to FIG. 3, support and indexing plate 22 is fixed on a shaft 38 which extends through front plate 16 and the rear end of shaft 38 is fixed to a toothed drive wheel 40, as is shown in FIG. 4. Wheel 40, and thus plate 22, are rotated by lens motor 42 having a toothed drive wheet 44 which meshes with drive sheel 40. An otherwise conventional shutter mechanism (not shown) is located beneath toothed drive wheel 40 and is operable by a pair of arms 46 which are connected to an operating bar 48, pivotally mounted at 50, the short end thereof being connected by an arm 52 to the plunger of an actuating solenoid 54. The movement of the operating bar is shown by phantom lines in FIG. 4. A return spring 56 is provided to maintain bar 48 in its normal condition and to return operating bar 48 to a normal condition after actuation of the shutter. With reference to the right hand portion of FIG. 4, there are a pair of switches 58, 60 stacked one upon another, both of which are transferred upon actuation of the shutter solenoid, the fingers of the switches being contacted by the lower end of operating bar 48 as is shown in phantom lines in FIG. 4. With reference to FIG. 2, switch 58 is further noted as SS-1 and switch 60 is noted as SS-2. Switch SS-1 is a control switch for operating various electrical and electronic components of the invention in a manner which will be explained below. Switch SS-2 actuates strobe 24. Due to the mechanical structure of the shutter operating mechanism and the strategic location of switches 58 and 60, as is seen in FIG. 4, firing of strobe 24 is delayed until the shutter is fully opened, at which time operating bar 48 transfers switch SS-2 to fire strobe 24.

Returning to FIG. 3, support and indexing plate 22 includes four recesses or arcuate cut-outs 62 about the periphery thereof, and spaced 90° from one another. Plate 22 also includes an aperture 64, which is aligned with lens 18 (FIG. 1), and four support posts for mounting turret 20 on plate 22. Three of the support posts 66 are of small diameter and a fourth support post 68 has a larger diameter so as to actuate or transfer a microswitch as it passes by the contact finger of the microswitch. There are three such microswitches 70, 72 and 74 arranged about the periphery of plate 22. There is a fourth microswitch 76 having a rolling contact 78 on the outer end of its operating finger which rides about the periphery of plate 22. This switch is transferred as plate 22 rotates from one position to the next but returns to a normal condition when contact 78 falls into one of the four recesses 62. This operation will be explained in further detail below. An indexing spring arm 80 is affixed to front plate 16 adjacent the periphery of indexing plate 22 and rides about the periphery of plate 22 when plate 22 is rotated from one position to the next, the arm falling into a notched recess 62 at the completion of a quarter turn rotation of lens turret 20. With reference to FIG. 2, the microswitches 70, 72, 74 and 76 are denoted as switches LS-1, LS-2, LS-3 and LRS. Their function is explained below.

This embodiment of the invention provides a six frame format for each sheet of sensitized film. By sequential movement but not simultaneous movement of film support plate 28 and rotation of lens turret 20, the single sheet of film is divided into six separate frames for six separate pictures and the resulting picture is shown at 82 in FIG. 8. From the explanation just given, it can now be appreciated that lens 18 is rotated to four different positions, each being spaced 90° apart. The first frame or picture exposure will be taken when lens 18 is in an approximate 1:30 o'clock position as is illustrated in FIG. 1. The lens will be rotated counter-clockwise for taking successive pictures; these positions are 10:30 o'clock, 7:30 o'clock and 4:30 o'clock. Thus, it is necessary that the front cover 16 have four apertures therethrough at each of these positions and these are indicated at 84 in FIG. 4.

The structure of the rear of the camera of this automatic embodiment of the invention is disclosed in FIGS. 5 and 6. The inside of the back cover 86 is shown in FIG. 5. An aperture box or cage 88 having a four separate light tunnels 90 is positioned on back cover 86 so that the light tunnels 90 are aligned with the front cover apertures 84 with the camera assembled. A back motor 92 is secured to the inside cover 86 and includes a drive shaft 94 extending through the rear of back cover 86. Of course, back cover 86 has four apertures 96 aligned with the light tunnels 90. Referring now to FIG. 6, the rear of the camera is illustrated. At the bottom of the camera, there is an enclosure 98 which houses the light for the aiming or framing light 26. Further components include a key operated switch 100, a fuse 102 and a conventional cord 104 for connection to a standard source of 120 Vac. These components are also shown at the lower left of FIG. 2. A back plate 106 is located centrally on back cover 86 and includes four apertures which are aligned with the apertures 96 in cover 86 and thus with the tunnels 90 of the aperture cage 88. Film support plate 28 is mounted for controlled, lateral sliding movement across back plate 106. The base of film holder 30 is secured to film support plate 28 by conventional means, such as screws 108, for example. The top end or edge of plate 28 is retained for sliding movement across back plate 106 by a retaining bar 110. The lower edge of film support plate 28 is toothed to form a gear rack 112 which meshes with toothed gear 114 which is affixed to drive shaft 94 from back motor 92 (FIG. 5). Gear 104 includes a switch actuation pin 116 which alternately transfers one or the other of switches 118 and 120, by contacting the operating finger of the switch. The switches 118, 120, also shown as switches BS-1 and BS-2 in FIG. 2, have specific control functions which will be explained below.

The central portion of plate 28 has six equal apertures 122 formed therethrough, four of which are aligned with light tunnels 90 at all times during operation of the camera. The bottom right-hand corner of each aperture includes indicia 124 formed in the material of plate 28 which serve to identify each frame of the single sheet of film so that each individual picture may be associated with an already prepared identification card after the complete sheet of film has been exposed. Film support plate 28 is made of plastic, preferably. Since Arabic numerals would be difficult to cast, the indicia are formed as Roman numerals I through VI as illustrated. Turning now to FIG. 8, which shows a sheet of film after six exposures, it can be seen that the self developed images will bear the identifying indicia for appropriate association with a printed identification card such as shown in FIG. 9.

The photo identification system of the invention may now be explained. As an example, it is assumed that the camera is being used to produce individual identification cards for the employees of a company. Of course, individual photographs will be taken of each employee and the fully exposed print shown in FIG. 8 would include the pictures of six different employees. The developed print is then die cut into six individual photographs, as is conventional. It is further assumed that an identification card, such as shown in FIG. 9, has already been filed in with an employee's name, title and and signature. To the left of this area on the card on FIG. 9 are indicia 126 which are used to associate the proper photograph with the appropriate card. When the picture of the employee was taken, the camera operator marked the indicia area 126. The film tab 36 was noted by the operator when the picture was taken and the appropriate film tab Arabic numeral was circled on the card 128 in FIG. 9. Returning to FIG. 6, there are a series of six LED's 130 numbered with Roman numerals I-VI. (The LED's 130 are further illustrated in the wiring diagram of FIG. 2, at the lower right of the Figure). One of these LED's will be lit when an individual picture is taken and this identifies which frame of the six on the print 82 is being exposed. On the identification card 128, the operator then circles the Roman numeral corresponding to the one LED 130 which is lit. Later, when the photograph is being associated with its identification card, the operator knows both the tab number and frame number and can attach the individual photograph to its appropriate card. The photograph will be glued or attached to the card, over indicia 126. The card is then conventionally sealed in plastic, preferably, and the completed card is delivered to the employee. The reason for the eight Roman numerals on the identification card is because the camera of this invention may be modified for an eight format or four format configuration, thus to produce eight or four photographs on single sheet of film instead of six, as is the case with the present embodiment. However, the present embodiment is preferred because the Poloroid film with which the invention is used can be neatly divided into six equal size photographs, each having a readily acceptable size of approximately one and one-quarter inches by one and seven-sixteenths inches. Modification of the camera to achieve an eight or four format configuration will become apparent below.

There are other controls and indication lights at the top rear of the camera, adjacent LED's 130. The "pull" film LED 132 is lit at the completion of six exposures on a single sheet of film and this tells the operator to pull the sheet of film from the film holder 30. The "on" LED 134 tells the operator that the camera is connected to a suitable source of electric current and is ready for operation. The "aim" button 136 activates framing light 26 so that the subject may be aligned with the camera. Of course, either the camera may be moved or the subject may move to accomplish the alignment. The "fire" button 138 is depressed to take an individual picture and to operate other components of the invention as will be explained below.

Turning now to FIG. 2, the remaining electrical and electronic components of the automatic embodiment of the invention will be discussed. A transformer 140 is provided for producing reduced voltage. Transformer 140 is also illustrated in FIG. 4, the transformer being mounted on the rear of front cover 16. A series of five, non-latching relays are provided and these are identified as K1, K2, K3, K4 and K5. Relay K1 has four movable contacts numbered 1 through 4 and each of the relays K2–K5 has two movable contacts, numbered 1 and 2. Fire button 138 is also identified as switch PBS-1 in FIG. 2 and the aim button 136 is further identified as switch PBS-2 in FIG. 2.

The operation of this six format automatic system embodiment of the invention may now be explained. As shown in the wiring diagram of FIG. 2, the system circuitry is in condition for exposure of a picture through film support aperture I (upper left aperture on film support plate 28, FIG. 6). Of course, the camera has been connected to a standard source of 120 VAC. All switches and relay contacts are in a normal condition except that back switch BS-2 is transferred, due to the location of film support plate 28 to the right-hand position, in the sense of FIG. 6. In this position, pin 116 on gear 114 engages the operating finger of switch 120 or BS-2. With film support plate 28 in this right-hand position, the apertures numbered I, II, V and VI are aligned with the light tunnels 90. With reference to FIG. 1, lens 18 is in a 1:30 o'clock position and aligned with the aperture 122 of film support plate 28 numbered I. With reference to FIGS. 2 and 3, lens switch LS-3 or 74 is transferred because the large diameter support post 68 is an engagement with the operating finger of the switch 74, as shown in FIG. 3. With switch LS-3 transferred, as shown in FIG. 2, LED 1 is on, from DC current passing through switches LRS, LS-1, LS-2 and LS-3 to LED 1. Of course, this indicates that the camera is ready to take a picture through frame I (FIG. 6). As stated previously, the "on" LED 134 simply indicates that the camera is connected to the source of electric current and is ready to operate. At this time, switch PBS-2 may be depressed and the pencil beam of light from framing light 26 is aimed to the center of the subject being photographed; the camera may be manually repositioned as necessary or the subject may move.

The picture I is taken by depressing the "fire" button, PBS-1. Relay K3 is energized from a DC source 142, adjacent switch LRS, through the lens releasing switch LRS and relay K5, through contact 1 thereof, to the plus side of relay K3. This causes contacts 1 and 2 of relay K3 to transfer. Shutter selonoid 54 is thus energized, from an AC source 144 through contact 4 of relay K1. In turn, switch SS-1 and strobe switch SS-2 are transferred; strobe 24 is energized from its connection to the AC source as illustrated. Of course, a slight delay occurs before strobe 24 fires, to assure that the shutter is in a full open position prior to firing of the strobe. This is conventional and was explained previously. Now, since switch SS-1 is transferred, current passes from the DC source 146 at switch SS-1 to contact 2 of relay K2. From there, current is branched to the plus side of relay K5. This causes contacts 1 and 2 of relay K5 to transfer, thus energizing lens motor 42 and causing lens turret 20 to rotate. As soon as the lens turret 20 begins to rotate, the lens release switch LRS or 76 is transferred because the lens turret support plate 22 (FIG. 3) rotates, thus to lift the contact 78 of switch LRS or 76 out of the depression or recess 62 in which it is located. This causes current from DC source 142 to pass back through the branch below contact 2 of the relay K2 to the plus side of relay K5 and thus relay K5 stays energized. Accordingly, the contact 2 of relay K5 remains transferred and lens motor 42 continues to operate.

Simultaneously, relay K3 is deenergized because contact 1 of relay K5 is also transferred, breaking current to the plus side of relay K3. Thus, contacts 1 and 2 of relay K3 return to their normal condition and thus shutter selonoid 54 is deenergized. Accordingly, switches SS-1 and SS-2 return to a normal condition. With relay K3 thus deenergized, due to the transferred position of contact 1 of relay K5, a double exposure is prevented even if "fire" switch PBS-1 should be accidentally or intentionally depressed.

Lens motor 42 continues to rotate lens turret 20, counter-clockwise in the sense of FIG. 1, through 90°, from its initial 1:30 o'clock position to an approximate 10:30 o'clock position. At that point, contact 78 of lens release switch 76 or LRS falls into a second depression 62 on turret support plate 22 and switch LRS thus returns to a normal condition. Simultaneously, lens switch LS-1 or 70 is transferred because its operating finger is moved by contact with the enlarged support post 68 on plate 22, which has rotated 90° from the 9:00 o'clock position illustrated in FIG. 3 to a 6:00 o'clock position. With switch LRS in a normal condition, current to hold relay K5 open is broken. Thus, contacts 1 and 2 of relay K5 return to a normal condition, and the operation of lens motor 42 is stopped. Now since lens switch LS-1 is transferred, current from DC source 142 passes through switch BS-1 to diode D1 and the plus side of relay K2, thus to energize relay K2. Contacts 1 and 2 of relay K2 are now transferred. The transfer of switch LS-1 also causes current to pass through switch BS-1 to contact 3 of relay K1 and from there to LED II. LED II is thus energized indicating to the operator that picture 2 is ready to be taken. With reference to FIG. 6, it can be appreciated that rotation of the lens 18 to a 10:30 o'clock position aligns the lens 18 with aperture II in the film support plate 28. Thus, the second picture is ready to be taken.

The camera framing light 26 is actuated as before to assure the subject is properly positioned. Then "fire" switch PBS-1 is depressed. This causes relay K3 to be energized, exactly as before, causing contacts 1 and 2 of relay K3 to transfer, shutter selonoid 54 to actuate and strobe light 24 to fire, due to the transfer of switches SS-1 and SS-2. The transfer of switch SS-1 causes current to pass through contact 2 of relay K2 to the plus side of relay K1, thus energizing that relay and contacts 1, 2, 3 and 4 of relay K1 are thus transferred. The transfer of contact 4 of relay K1 breaks current flow to shutter selonoid 54 and switches SS-1 and SS-2 return to their normal condition. At the same time, relay K1 remains energized, from DC source 148 adjacent contact 1 of relay K2, to transfer to contact 1 of relay K1, then down to the plus side of relay K1, it being remembered that contacts 1 and 2 of relay K2 remain transferred due to the transferred position of lens switch LS-1. Now, with contact 4 of relay K1 transferred, AC current is passed to contact 2 of relay K4, which is deenergized, and the back motor begins operation, moving film support plate 28 to the left, in the sense of FIG. 6. It should be noted that back motor 92 is reversible and will operate to move film support plate 28 to the right when current is supplied through transferred contact 2 of relay K2, in a manner which will be explained below. Also, an accidental or intentional double exposure is prevented because current to shutter selonoid 54 has been broken and transferred to back motor 92. Thus, a new depression of "fire" switch PBS-1 would cause energization of relay K3 but would not trip the shutter or fire strobe 24.

Now, as film support plate 28 moves to its left hand position (FIG. 6), switch 120 or BS-2 returns to normal and switch BS-1 or 118 is transferred, because pin 116 is rotated about 180° through the operation of back motor 92. At this point, it is noted that none of the lens switches LRS, LS-1, LS-2 or LS-3 changed position because the lens turret 20 was not rotated. When switch BS-1 is transferred, relay K2 is deenergized because the circuit from transferred lens swith LS-1 through switch BS-1 to diode D1 and the plus side of relay K2 is broken. Thus, contacts 1 and 2 of relay K2 return to their normal condition, thus breaking the circuit from contact 1 of relay K2, to transferred contact 1 of relay K1 and down to the plus side of relay K1. With switches LS-1 and BS-1 now transferred, current passes from DC source 142 to switches LS-1 and BS-1, then down to LED III thus indicating to the operator that that picture III is ready to be taken. With reference to FIG. 6, frame aperture III is now positioned where frame II use to be, due to the left hand movement of film support plate 28. Since the lens 18 has not been moved from its 10:30 o'clock position, the lens 18 is now properly aligned with the frame aperture III.

As before, the alignment of camera and subject is checked and "fire" switch PBS-1 is depressed. At this time, all contacts and switches are in a normal condition except switches LS-1 and BS-1 which are transferred. Relay K3 is energized as before whereby contacts 1 and 2 of relay K3 are transferred, the shutter is opened and strobe 24 is fired. With shutter selonoid switch SS-1 transferred, current travels to normal contact 2 of relay K2 and thus to the plus side of relay K5 to energize that relay. This transfers contact 2 of relay K5 and the lens motor 42 is energized. With rotation of lens turret 20 and its lens turret support plate 22, contact 78 of switch LRS is lifted out of depression or notched 62 and switch LRS or 76 is transferred. Since relay K5 has been energized, contact 1 of relay K5 has also been transferred. So, relay K5 remains energized by current from DC source 142 through transferred switch LRS to transferred contact 1 of relay K5 and thus to the plus side of relay K5. Also, the transfer of contact 1 of relay K5 breaks current through fire switch PBS-1 to relay K3; thus, contacts 1 and 2 of relay K3 and switches SS-1, and SS-2 return to their normal position. As before, a double exposure is prevented because relay K3 cannot be reenergized.

As lens turret 20 completes its rotation to a position ready for taking of picture IV, transferred switch LS-1 or 70 (FIG. 3) returns to its normal position and switch LS-2 or 72 is transferred because enlarged post 68 on turret support plate 22 has now rotated from a 6:00 o'clock position, in the sense of FIG. 3, counter-clockwise to a 3:00 o'clock position, thus to depress the operating finger of switch 72. Also, switch LRS returns to a normal position because its contact 78 drops into another recess or depression 62. Lens 18 is now in an approximate 7:30 o'clock position and in alignment with film support plate 28 aperture IV as can be appreciated from an inspection of FIG. 6, it being remembered that film support plate 28 is already in a left-hand position, rather than in the right-hand position as illustrated in FIG. 6. With the return of switch LRS to its normal position, contact to the plus side of relay K5 is broken and the relay K5 is deenergized. This opens contact 2 of relay K5 and stops the lens motor 42. Relay K4 is now energized, thus transferring contacts 1 and 2 of relay K4, relay K4 being energized from switches LRS and LS-1 which are in a normal condition, through transferred switch LS-2 to switch BS-2, which is in a normal condition, and thus to the plus side of relay K4. Simultaneously, relay K2 is energized, thus transferring its contacts 1 and 2, relay K2 being energized from the same source through diode D2 to the plus side of relay K2. Finally, current also passes from the DC source 76 through switch LRS to close switch LS-1, transfer switch LS-2 through normal switch BS-2 and normally positioned contact 2 of relay K1 to LED IV, which lights to indicate that picture IV is ready to be taken.

The alignment of camera and subject is checked as before and "fire" switch PBS-1 is depressed. Relay K3 is energized as before, from the DC source 142 adjacent switch LRS. Contacts 1 and 2 of relay K3 are thus transferred to open the shutter and fire strobe 24, as before. When shutter switch SS-1 is transferred, with the energizing of shutter selonoid 54, current passes from the source 146 through transferred switch SS-1 to transferred contact 2 of relay K2 and to the plus side of relay K1 to energize that relay. Of course this transfers contacts 1-4 of relay K1; with contact 4 of relay K1 transferred, back motor 92 begins operation. Since back motor 92 is a reversible motor and a AC current is supplied through transferred contact 2 of relay K4 (it being remembered that relay K4 remains energized through normal contact BS-2 and transferred contact LS-2), and film support plate 28 is moved to the right, in the sense of FIG. 6. Relay K2 remains energized, due to normal switch BS-2 and transfer switch LS-2 and relay K1 is held energized from current passing from transferred contacts 1, 1 of relays K2 and K1 to the plus side of relay K1. A double exposure at this time is prevented because AC power to contact 2 of relay K3 has been broken and transferred to back motor 92 due to the transferred position of contact of relay K1.

As film support plate 28 completes movement to the right, in the sense of FIG. 6, switch BS-2 is transferred and switch BS-1 return to a normal position as pin 116 on gear 114 rotates counter-clockwise, in the sense of FIG. 6, through about 180°, out of engagement with switch BS-1 or 118 and into engagement with the operating finger of switch BS-2 or 120. This transfer of switch BS-2 deenergizes relays K1, K2 and K4 as follows. Relay K4 is deenergized because current from transferred switch LS-2 to the plus side of relay K4 is broken by the transfer of switch BS-2. This also interrupts current to the plus side of relay K2 and its contact then returns to normal, thus deenergizing relay K1 since current no longer flows to transferred contact 1 of relay K1 to the plus side of relay K1 as before. Consequently, contact 4 of relay K1 returns to normal, thus interrupting AC current to back motor 92 and back motor 92 stops. Lens 18 has remained at the 7:30 o'clock position and is now aligned with frame aperture V of film support plate 28, as is illustrated in FIG. 6. Finally, DC current passes through normal switches LRS and LS-1 to transferred switches LS-2 and BS-2 to LED V to indicate that picture V is ready to be taken.

Camera and subject are aligned as before, if necessary. "Fire" button PBS-1 is depressed to take the picture. Relay K3 is energized as before, from normal switch LRS through normal contact 1 of relay K5 to the plus side of relay K3. This actuates selonoid 54 from AC source 144 adjacent normal contact 4 of relay K1 and the shutter and strobe actuate as before. With shutter switch SS-1 transferred, by energization of selonoid 54, lens motor 42 starts rotating lens turret 20 as current passes through normal contact 2 of relay K2 to the plus side of relay K5, thus energizing that relay and transferring its contact 2 and AC current is directed to lens motor 42. Switch LRS is now transferred, with the rotation of lens turret 20, thus assuring continued energizing of relay K5 by current passing from DC source 142, through switch LRS to the plus side of relay K5. Thus, the lens turret 20 continues to rotate. At the same time, switch LS-2 returns to normal, thus turning off LED V as post 68 (FIG. 3) rotates beyond the operating finger of switch LS-2, or 72. A double exposure is prevented because contact 1 of relay K5 remains transferred, thus interrupting any current flow to the plus side of relay K3.

When lens 18 rotates to an approximate 4:30 o'clock position, in the sense of FIG. 1, switch LRS return to a normal position by reason of its contact 78 falling into a recess or depression 62. Thus, current to the plus side of relay K5 is interrupted and relay K5 is deenergized to stop lens motor 42, since contact 2 of relay K5 returns to normal. At this point, switches LRS, LS-1, LS-2 and LS-3 are in a normal position because post 68 on turret support plate 22, (FIG. 3) has rotated counter-clockwise to an approximate 12:00 o'clock position and thus out of contact with any of the switches surrounding the turret support plate 22. Thus, current flows from DC source 142 to LED VI to energize LED VI which tells the operator that picture VI is ready to be taken. At this time, only switch BS-2 is transferred; all other contacts and switches are in a normal position and all relays K1–K5 are deenergized. With reference to FIG. 6, it can be appreciated that lens 18 in a 4:30 o'clock position in the sense of FIG. 1 is aligned with frame aperture VI in film support plate 28.

Camera and subject are aligned as before and fire button PBS-1 is depressed to take picture VI. Relay K3 is energized by current passing from DC source 142 through normal switch LRS and normal contact 1 of relay K5 to the plus side of K3. Thus, shutter selonoid 54 is energized and strobe 24 is fired. With switch SS-1 transferred, current passes from DC source 146 through normal contact 2 of relay K2 to the plus side of relay K5 which is now energized. This transfers contact 2 of relay K5 and lens motor 42 starts to rotate lens turret 20 and lens 18 from the 4:30 o'clock position to a 1:30 o'clock position. Relay K5 remains energized because switch LRS transfers upon rotation of lens turret 20; thus, current flows from DC source 142 through transferred switch LRS and transferred contact 1 of relay K5 to the plus side of relay K5. A double exposure is prevented because of the transfer of contact 1 of relay K5; no current can pass to the plus side of relay K3. Also, LED VI is turned off as soon as switch LRS is transferred, due to the initiation of rotation of lens turret 20.

When lens 18 reaches the 1:30 o'clock position, switch LRS returns to a normal condition since its contact 78 drops into another recess or depression 62. This breaks the flow of DC current to the plus side of relay K5 and it is deenergized, contact 2 of relay K5 returns to normal thus interrupting flow of AC current to lens motor 42, and the rotation of lens turret 20 ceases. At the same time, the operating finger of switch LS-3 or 74 is contacted by post 68 on lens turret support plate 22 thus transferring switch LS-3. Thus, current passes from DC source 142 through normal switches LRS, LS-1 and LS-2 to transferred switch LS-3 and LED I. Current also passes through a timer 150 and to the "pull film" LED 132. The timer may include flasher circuitry (not shown) for LED 132 if desired. The timer is provided to turn off LED 132 after a predetermined period of time, e.g., 15 or 20 seconds. This tells the operator to pull the film tab of the film pack within holder 30 since a complete cycle of six pictures has been taken.

Assuming more film remains in the film pack within holder 30, the exposure cycle may now be repeated since all components are in a position to expose the first picture, as explained above. Specifically, switches LS-3 and BS-2 are transferred, the lens 18 is in a 1:30 o'clock position, film support plate 28 is in a right-hand position in the sense of FIG. 6, and LED I is on, to indicate that the first picture is ready to be taken. If no film remains in the camera of film holder 30, then no number appears on the exposed tab 36 and the operator cannot transfer a number onto the identification card 128, in the manner previously explained. Thus, the operator knows to load a new film pack into the film holder 30.

Although the preferred form of the invention provides a six frame format for each sheet of film, the invention may be easily modified to provide a four frame format or an eight frame format. For example, the framing apertures on the rear of the camera may be enlarged to provide only four frames in the resulting picture disclosed in FIG. 8. The camera could then be rotated 90° and attached to support stand 12. In this example, only the lens motor would be required since only four pictures need to be taken. An eight frame format can be provided by reducing the size of the apertures at the rear of the camera, and providing an extra set of apertures in the film support plate 28. The back motor and circuitry can then be easily modified to provide a double stage shifting of film support plate 28, instead of the single stage shifting in the six frame format camera. In any event, these modifications are by way of example only and others will be readily apparent to those skilled in the art.

Referring now to FIGS. 10-18, the manual embodiment of the camera of this invention will be discussed. In the preferred embodiment, the manual embodiment is also designed on a six frame format. The principal distinction of this embodiment is that both the lens turret and film support plate with film holder are moved manually instead of automatically.

As before, a stand 12 and thumb screw 14 are provided for mounting a camera body 152. Handles 154 and 156 may be provided on either side of camera body 152 which can be grasped by the operator during use of the camera to stablize the same. Camera body 152 includes a front cover or plate 158 through which are mounted a strobe 24 and a framing or aiming light 26 which are structured and function in the same manner as in the previous embodiment. For the purpose of compact construction, however, the framing light 26 is located on the upper portion of cover 158, adjacent strobe 24. A lens 160 is mounted on a rotatable turret 162 which is secured to a manually rotatable support and indexing plate 164 (FIG. 12), upon four equally sized posts 166. An axle 168 rotatably supports plate 164. The periphery of plate 164 includes four equally spaced recesses or notches 170 and an indexing spring arm 172 is provided which rides about the periphery of plate 164. As lens 160 is rotated manually, the spring arm 172 provides a tactile indication to the operator that a full 90° rotation has been accomplished.

Figure 12:
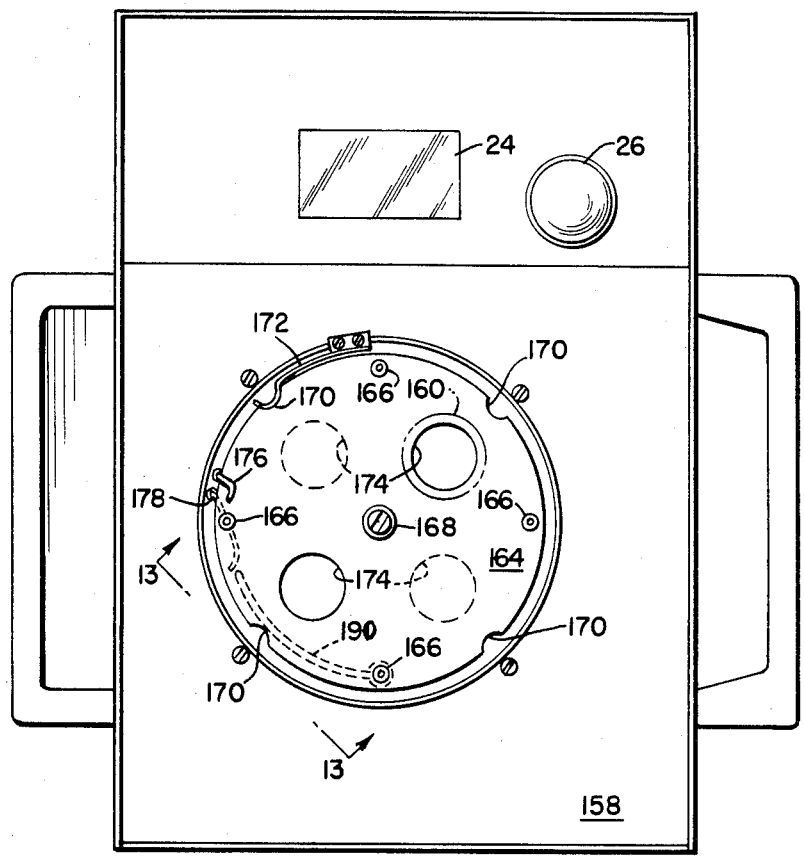
FIG. 12 is an elevation view of the front plate of the camera shown in FIG. 10 with the lens turret cover removed to reveal underlying components.
Figure 14:
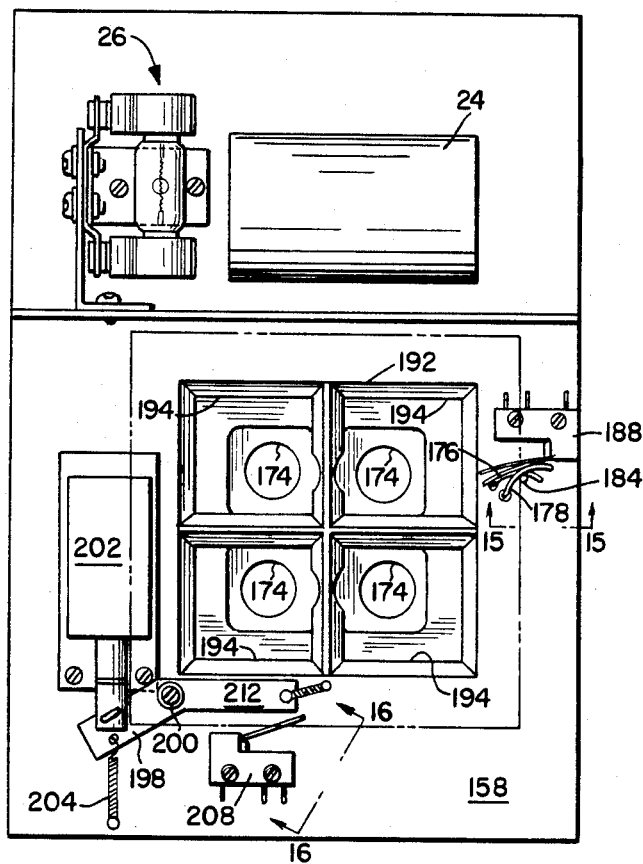
FIG. 14 is an elevation view of the rear of the front plate of the camera shown in FIG. 12.

Since lens 160 will be rotated to four individual positions, as in the previous embodiment, four apertures are required through cover 158 and these are indicated at 174 in FIGS. 12 and 14.

Figure 15:
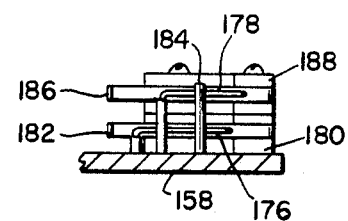
FIG. 15 is a fragmentary detail view taken along lines 15—15 of FIG. 14.

Attention is now drawn to the left hand side of FIG. 12 and the right hand side of FIG. 14, FIG. 12 illustrating the front of the camera with the lens turret 162 removed and FIG. 14 disclosing the inside of the front cover 158 of the camera. A pair of switch operating arms 176, 178 are mounted through front cover 158 for pivotal movement about a horizontal axis. Arm 176 is deflected each time a post 166 passes thereby to transfer a switch 180 for reasons to be explained below. Referring to FIGS. 14 and 15, the inherent resiliency of operating finger 182 of switch 180 retains the arm 176 in the position illustrated in FIGS. 12, 14 and 15. Additionally, a post 184 is mounted on the rear of cover 158 to retain the lower portion of switch operating arm 176 adjacent the operating finger 182 of switch 180. The switch 180 is also denoted as LS-2 in the wiring diagram of FIG. 11. Switch operating arm 178 has its upper portion located beneath supporting indexing plate 164 and is deflected only once during 360° of rotation of the plate 164. The lower portion of operating arm 178 is extended through cover 158 and terminates adjacent operating finger 186 of a switch 188, also denoted as switch LS-1 in FIG. 11. The lower portion of arm 178 is also retained behind post 184 adjacent finger 186, as is shown in FIGS. 14 and 15. As disclosed in these figures, switches 180 and 188 are simply stacked one upon another. Returning to FIGS. 12 and 13, a cam 190 is provided on the lower surface of indexing plate 164. With lens 160 in a 1:30 o'clock position as shown, cam 190 extends from about a 6:00 o'clock position beneath a post 166, clockwise to a position somewhat short of post 166 in a 9:00 position. The function and operation of cam 190 will be explained below.

Figure 11:
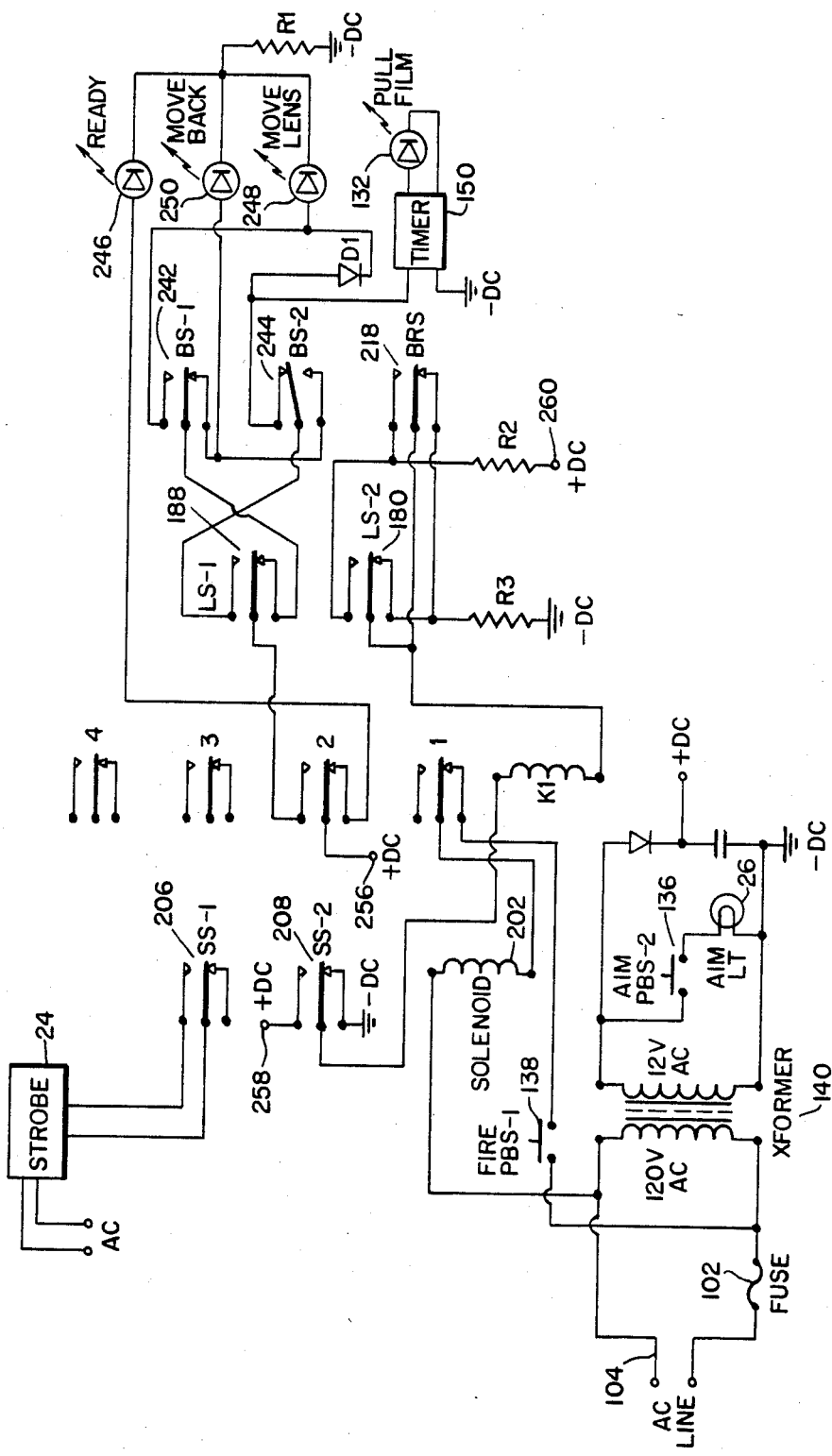
FIG. 11 is a wiring diagram of the electrical and electronic components of the embodiment illustrated in FIG. 10.
Figure 16:
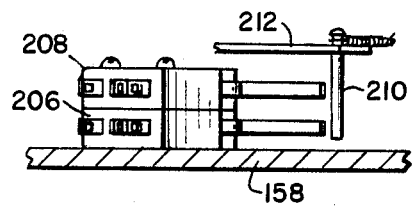
FIG. 16 is a fragmentary detail view taken along lines 16—16 of FIG. 14.

Turning again to FIG. 14, an aperture box or cage 192 having four separate light tunnels 194 is positioned on the inside of front cover 198 with the light tunnels 194 aligned with the four apertures 174 through front cover 158. The base or rear flange of aperture 192 is shown by phantom lines in FIG. 14 so that underlying structures are revealed in the figures. An otherwise conventional shutter mechanism (not shown) is located beneath aperture cage or box 192 and is operated from linkage 196 connected to an operating bar 198 which is pivotally mounted on the rear of cover 158 at 200. The other arm of operating arm 198 is connected to the plunger of a shutter actuating solenoid 202 which is also shown in FIG. 11. A return spring 204 is provided to maintain operating bar 198 in a normal condition and to return the bar to a normal condition after actuation of the shutter. With reference to FIGS. 14 and 16, there are a pair of switches 206, 208 positioned on the inside of cover 158 with their operating fingers adjacent a post 210 depending from end 212 of operating bar 198. Thus, each time the shutter is tripped by actuation of solenoid 202 and consequent withdrawal of the plunger into solenoid 202, post 210 is moved to transfer switches 206 and 208. These switches are also denoted as switches SS-1 and SS-2, respectively, in FIG. 11.

Figure 17:
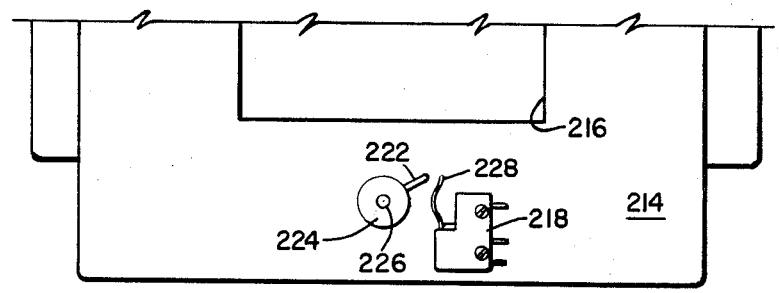
FIG. 17 is an elevation view of the inside of the back plate or cover of the camera illustrated in FIG. 10.
Figure 18:
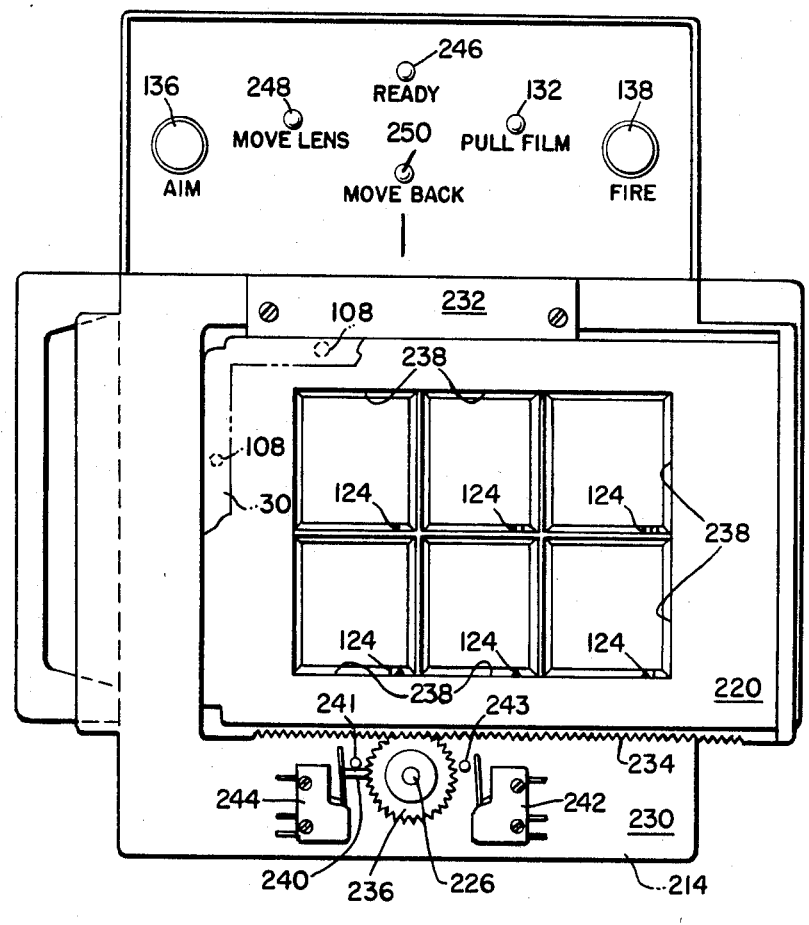
FIG. 18 is an elevation view of the rear of the back plate or cover of the camera shown in FIG. 10 with parts removed to shown underlying structure.

Referring now to FIG. 17, the inside of the back cover 214 of the camera is illustrated. A single cutout 216 is formed through back cover 214 and the periphery of the flange of the aperture box or cage 192 seats against the edge of cutout 216. Beneath cutout 216 is another microswitch 218 which is also denoted as switch BRS in FIG. 11. This switch is momentarily actuated each time film support plate 220 is moved across the back of the camera (FIG. 18). Actuation or transfer of switch 218 is accomplished by pin 222 extending from a hub 224 which is affixed to a shaft 226 which is rotatable and extends through back cover 214. The pin 222 is positioned to deflect the operating finger 228 of switch 218 each time it passes thereby.

The rear of the camera is illustrated in FIG. 18. A back plate 230 is located on back cover 214 and has four apertures which are aligned with the four light tunnels 194 (FIG. 14), through the cutout 216 in back cover 214 (FIG. 17). Film support plate 220 is mounted for lateral sliding movement across back plate 230. The base of the film holder 30 is secured to the film support plate 220 by conventional means such as screws 108, for example, as in the previous embodiment. The upper edge of plate 220 is retained for sliding movement by a retaining bar 232. The lower edge of plate 220 is toothed to form a gear rack 234 which meshes with a toothed gear 236 which is affixed to the end of shaft 226 extending through back cover 214 and back plate 230. Gear 236 includes a switch actuation pin 240 which alternately transfers one or the other of switches 242 and 244, by contacting the operating finger of the switch. The switches 242 and 244, also shown as switches BS-1 and BS-2, have specific control functions which will be set forth in detail below.

A central area of film support plate 220 has six equal sized apertures 238 formed therethrough, four of which are aligned with light tunnels 194 at all times during the operation of the camera. As in the previous embodiment, the bottom right hand corner of each aperture 238 includes indicia 124 formed in the material of the plate 220 which serves to identify each frame of the sheet of the film so that each individual picture may be associated with an already prepared identification card, in a manner previously explained. For ease of casting, the indicia are formed as Roman numerals I through IV.

In order to prevent overshifting of film support plate 220, since it is moved manually left and right, a pair of stop pins 241, 243 are provided to define the limits of rotation of switch actuation pin 240. The teeth of gear 236 and rack 234 are dimensional so that a full left manual shift of plate 220 aligns the righthand four apertures 238 with cutout 216 (FIG. 17) and a full right shift aligns the lefthand four apertures 238 with cutout 216 (FIG. 17). Pin 243 defines the lefthand limit of travel of plate 220 and pin 241 defines the righthand limit of travel of plate 220.

With reference to the upper portion of FIG. 18, the back of the camera 214 includes control buttons and direction lights for operation of the camera. The following components are the same as in the first embodiment: "aim" button 136, "fire" button 138, transformer 140, fuse 102 and AC line 104. The back 214 also includes LED's which are sequentially lit to direct the operator of the camera to perform certain functions. These LED's include a "ready" LED 246, a "move lens" LED 248, a "move back" LED 250 and a "pull film" LED 132, which is the same as in the previous embodiment. Also, a timer 150 is included which again has the same structure and function as in the previous embodiment. These components are also shown in FIG. 11. In this embodiment, only a single relay K1 is used (FIG. 11) and this is a latching type relay for reasons to be explained below.

Returning to FIG. 10, the turret 162 includes an indexing dot 252 which is aligned with numbers on cover 158 to indicate to the operator the appropriate location for the lens when taking pictures 1, 3, 4 and 5. Also, the turret 162 includes an arrow 154 which gives a visual indication to the operator of the direction in which the lens is to be rotated.

Figure 10:
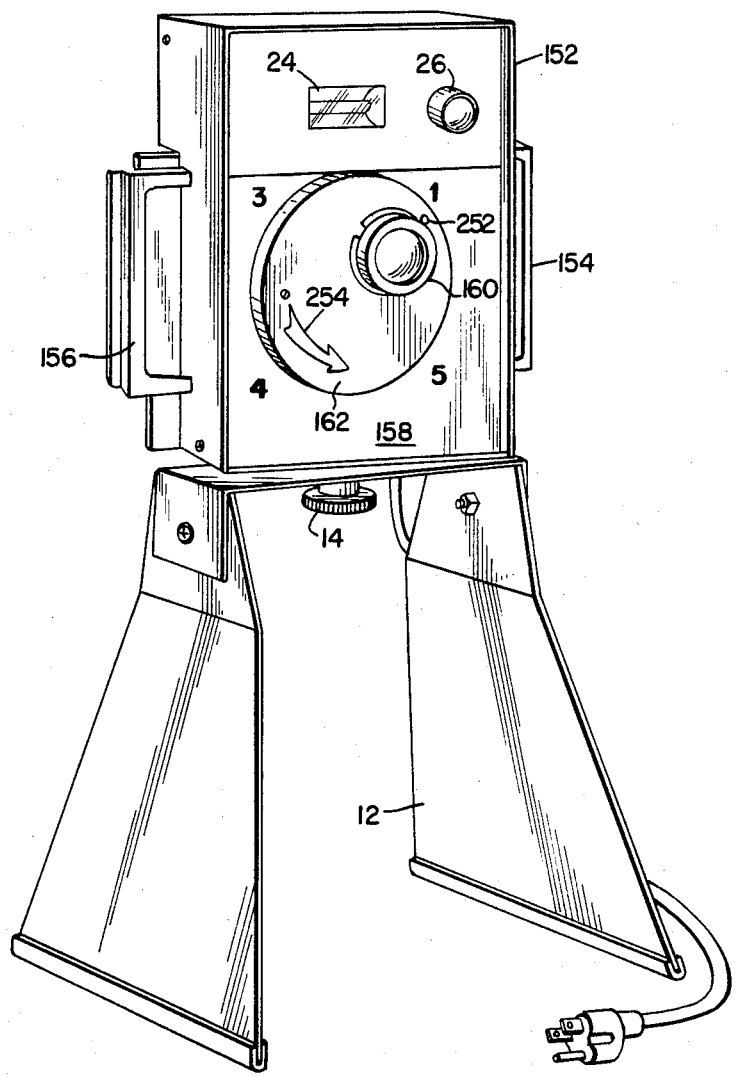
FIG. 10 is a perspective view of a manually operated embodiment of the invention.

The operation of the six format manual system embodiment of the invention follows. Again, FIG. 11 illustrates the wiring diagram of this embodiment and shows the circuitry and condition for taking a first picture through frame aperture I (upper left aperture 238, FIG. 18). The camera is connected to a standard 120 VAC source as shown. Switch BS-2 is transfered since the film support plate 220 is in the right hand position in the sense of FIG. 18. Referring to FIG. 10, lens 160 is in an approximate 1:30 o'clock so as to be aligned with the frame aperture I in plate 220. All other switches, contacts and the latching relay K1 are in a normal condition.

With the cameral connected to a suitable source of 120 VAC, the "ready" LED 246 is lit by current passing from the + DC source 256 adjacent normal contact 2 of K1, through contact 2 of relay K1, the "ready" LED 246 and to ground through resistor R1. The camera and subject are aligned as in the first embodiment, aiming light 26 being energized by depression of a switch PBS-2.

"Fire" switch PBS-1 is depressed to take the first picture. 120 AC current is tranferred through normal contact 1 of relay K1 to energize shutter solenoid 202 and transfer the shuttter switch SS-2 and the strobe switch SS-1 in the manner previously explained. The transfer of switch SS-2 causes latching relay K1 to be energized and latch as current passes from the + DC current source 258 adjacent switch SS-2 to the + side of relay K1; the circuit is completed from the other side of relay K1 through normal switch BRS through resistor R3 to ground as shown in FIG. 11, and/or through normal switch LS-2 through resistor R3 to ground, it being noted that switches LS-2 and BRS are wired in parallel.

Now, the latching of relay K1 causes shutter solenoid 202 to deenergize because contact 1 of relay K1 is transferred, thus breaking the circuit to shutter solenoid 202. Thus, switches SS-1 and SS-2 return to normal. It can be appreciated that a double exposure is prevented because relay K1 is energized and latched to retain contact 1 of relay K1 open, thus preventing closing of the AC circuit to shutter solenoid 202, upon a repeat accidental or intentional depression of "fire" switch PBS-1.

With relay K1 latched, the "move back" LED 250 is lit by current passing from DC source 256, through the transfer contact 2 of relay K1, to normal switch LS-1, normal BS-1, "move back" LED 250, to resistor R1 and ground. Since the film support plate 220 can be moved to only two position, far right and far left in the sense of FIG. 18, the operator knows to move the back to the left. This will align aperture II of the film support plate 220 with lens 160 since lens 160 has not been moved.

When film support plate 220 is moved to the left, switch BS-1 is transferred and the switch BS-2 returns to normal, due to the rotation of gear 236, meshed with lower gear rack 234 of film support plate 220, which rotates gear contact finger 240 counterclockwise about 180° in the sense of FIG. 18. Simultaneously, switch BRS is momentarily transferred (FIG. 17) since it is mounted on the same axle 226 as gear 236. Switch BRS is so mounted that contact finger 222 sweeps by the operating finger 228 of switch BRS (or 218, FIG. 17) just before film support plate 220 reaches a far left hand position, whereupon switch BRS returns to a normal position.

The momentary transfer of switch BRS unlatches relay K1 as current passes from + DC source 260 through resistor R2 and transferred switch BRS, to relay K1, normal switch SS-2 and ground. This causes contact 2 of relay K1 to return to normal thus interrupting current to the "move back" LED 250 and reenergizing the "ready" LED 246 as before.

Picure II is ready to be taken and the camera and subject are aligned as before. The depression of "fire" switch PBS-1 energizes shutter solenoid 202 and switches SS-1 and SS-2 are transferred as previously explained to trip the shutter and fire a strobe 24. Relay K1 is also energized and latched as it was when picture I was taken. Again, a double exposure is prevented as before because contact 1 of relay K1 is transferred. Now, the "move lens" LED 248 is energized, by current passing from + DC source 256 through transferred contact 2 of relay K1 through normal switch LS-1 and transferred BS-1 to "move lens" LED 248, resistor R1 and ground.

With reference to FIG. 10, lens turret 160 is rotated counterclockwise about 90° to an approximate 10:30 o'clock position so that the indexing dot 252 is aligned with the numeral "3" on a turret 162. With reference to FIG. 18, this will align lens 160 with frame aperture III of film support plate 220 since the plate 220 has not been moved. The camera operator senses that the position has reached in a tactile manner as spring figure for arm 172 snaps into a depression 170 on the lens turret plate 164 (FIG. 12) when the position is reached. When lens 160 reaches the position ready for picture III, switch LS-2 (or 180, FIG. 15) is momentarily transferred. Operating arm 176 is momentarily deflected by a post 166 passing thereby (FIG. 12) which causes the lower end of arm 176 to strike against operating finger 182 of switch 180, thus to momentarily transfer the switch. This causes relay K1 to unlatch as a circuit is completed form + DC source 260 through resistor R2, through transferred switch LS-2 to relay K1, normal switch SS-2 and ground. The "ready" LED 246 now comes on with contact 2 of relay K1 returned to a normal position.

Camera and subject are aligned and picture III is taken. Shutter solenoid 202 and relay K1 are energized as before as the picture is taken. With relay K1 energized and latched, a circuit is completed from + DC source 256 through transferred contact 2 of relay K1, normal switch LS-1, transferred switch BS-1 to "move lens" LED 248, resistor R1 and ground.

Lens turret 160 is rotated counterclockwise to an approximate 7:00 o'clock position so that indexing dot 252 is adjacent the numeral "4" on the front cover 158 of the camera. This also aligns the lens with frame aperture IV of film support plate 220 which has not been moved. During this rotation, another support peg 166 on lens turret support plate 164 momentarily contacts operating arm 176 which transfers switch 180 momentarily, as before, to unlatch relay K1 as previously explained. Now the "ready" LED 246 is lit, as contact 2 of relay K1 is in a normal position.

Figure 13:
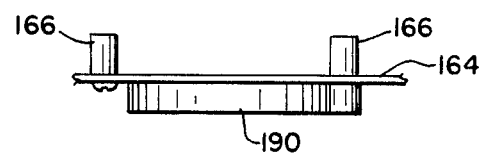
FIG. 13 is a fragmentary detail view taken along lines 13—13 of FIG. 12.

The camera and subject are aligned and picture IV is taken. The shutter and strobe are activated and relay K1 is energized and latched as before. Contact 2 of relay K1 is transferred and the "move lens" LED is lit through normal switch LS-1 and transferred switch BS-1. Lens turret 160 is rotated through about 90°, counterclockwise, to an approximate 4:30 o'clock position in the sense of FIG. 10 so that the lens 160 is aligned with the numeral "5" on the front cover 158 of the camera. This is visually indicated with the assistance of the indexing dot 252. As this occurs, switch LS-2 is momentarily transferred as operating arm 176 for switch 180 or LS-2 contacts a support post 166 on lens turret plate 164 and the relay K1 is unlatched as previously set forth. This causes the "ready" LED 246 to be lit because contact 2 of relay K1 has again returned to a normal position. Also, it must be noted that switch LS-1 is transferred as the lens 160 reaches the 4:30 o'clock position, in the sense of FIG. 10. With reference to FIGS. 12 and 13, when the lens 160 reaches the 4:30 o'clock position, an initial portion of cam 190 deflects operating arm 178 thus causing the lower portion of arm 178 to contact operating finger 186 of switch 188 (FIGS. 14 and 15) or switch LS-1. The "ready" LED 246 is lit again because contact 2 of relay K1 is in a normal position. With reference to FIG. 18, it will be appreciated that frame aperture V is aligned with lens 160 since film support plate 220 is in its left hand position and has not been moved. Thus, frame aperture V is aligned with lens 160 when lens 160 is in the 4:30 o'clock position in the sense of FIG. 10.

Camera and subject are aligned and picture V is taken by depressing "fire" switch PBS-1. The shutter and strobe are activated, relay K1 is transferred and latched, and a circuit is completed from transfer contact 2 of relay K1 through transferred switch LS-1 to normal switch BS-2, "move back" LED 250 and ground. This instructs the operator to move film support plate 220 to take picture VI and film support plate 220 can only move to the right as it is in a far left hand position. As the film support plate 220 is moved, the switch BRS is momentarily transferred in the same manner as it was when film support plate 220 was moved to the left in preparation for taking picture II. The momentary depression of switch BRS causes relay K1 to unlatch and its contacts to return to normal in the manner previously set forth. This right hand movement of film support plate 220 also causes BS-1 to return to normal and switch BS-2 to transfer as the gear contact finger 240 rotates from switch BS-1 (or 240 in FIG. 18) to switch BS-2 (or 244 in FIG. 18). With contact 2 of relay K1 in a normal position, the "ready" LED 246 is lit as before and picture VI may now be taken. With reference to FIG. 18, it will be noted that frame aperture VI is aligned with lens 160 as lens 160 is a 4:30 o'clock in the sense of FIG. 10.

The camera and subject are aligned as before, picture VI is taken and relay K1 is energized and latched thus transferring contact 2 of relay K1. A circuit is completed from transferred contact 2 of relay K1 through transferred switch LS-1 and transferred switch BS-2 to diode D1, "move lens" LED 248, resistor R1 and ground. Also, a circuit is completed through the timer 150 and "pull film" LED 132 to instruct the operator to pull the now fully exposed film from the film pack or holder 30. As before, the timer is provided to turn off "pull film" LED 132 after a predetermined duration of time. A flasher could be used in place of the timer 150 or combined with the timer.

The "move lens" LED is on as explained to instruct the operator to rotate lens 160 from its 4:30 o'clock position back to its initial 1:30 o'clock position. However, some means must be provided to keep switch LS-1 transferred during the rotation of the lens turret 162. Otherwise, a circuit would be completed through normal switch BS-1 and "move back" LED 250, giving a confusing instruction to the camera operator. Thus, the reason for cam 190 (FIGS. 12 and 13) becomes apparent. As the lens turret 162 is now rotated, a switch LS-1 remains transferred until just before lens 160 reaches its initial 1:30 o'clock position. As the position is reached, the operating arm 178 for switch 188 (or LS-1) leaves the end of the cam 190 and the switch LS-1 returns to a normal position.

As lens turret 162 is rotated to the 1:30 o'clock position, switch LS-2 or 180 is momentarily actuated as operating arm 176 for switch 180 is deflected by support post 166 passing thereby (FIG. 12). This momentarily transfers LS-2 to unlatch relay K1 and return its contacts to a normal position as previously explained.

With lens 160 again in the 1:30 o'clock position, the full cycle of six pictures and the camera and circuitry are ready for another cycle. Only switch BS-2 is transferred; all other switches, contacts and the relay K1 are in normal position. This was the status set forth above when picture I was ready to be taken. Of course, "ready" LED 246 is lit because contact 2 of relay K1 is in a normal position. On the other hand, if the film pack is out of film, the operator will be alerted by the status of the tabs from the film cassette within the film holder 30.

The invention may be embodied in other specific forms without departing from the spirit or essential characteristics thereof. The present embodiments are therefore to be considered in all respects as illustrative, not restrictive, the scope of the invention being indicated by the appended claims rather than by the foregoing description and all changes which come within the meaning and range of equivalency of the claims are therefore intended to be embraced therein.

I claim:

1. A camera for producing multiple, sequential generally equisized images on a film element comprising:
   a front support plate having multiple apertures therein;
   a lens turret assembly rotatably mounted on a front wall of said front support plate and having a single lens sequentially rotatable into selective registry with said front support plate apertures;
   a back support plate;
   a film support plate;
   means for mounting and bidirectionally moving said film support plate transversely across the rear of said back support plate;
   a plurality of apertures formed through said back support plate, said front and back plate apertures being aligned whereby images may be transferred from said lens through selected aligned pairs of said front and back plate apertures to said film support plate;
   means defining a plurality of apertures through said film plate, said film plate apertures having dimensions approximately the same as said back plate apertures;
   means for mounting a film pack cartridge on the rear of said film plate, over said film plate apertures; and
   shutter actuated means mounted adjacent said front plate apertures;
   whereby upon predetermined, sequential rotation of said lens turret or transverse movement of said film plate, selected ones of said film plate apertures are brought into unobstructed registry with said lens for exposure of an image through a selected back plate aperture from said single lens.

2. The camera as claimed in claim 1, wherein both of said front and back plate apertures are four in number and said film plate apertures are six in number, said lens turret being rotatable in a predetermined sequence and said film plate being bidirectionally moved also in a predetermined sequence, thus to selectively expose each of said film plate apertures in a patterned manner to complete an exposure cycle.

3. The camera as claimed in claim 2, wherein said front and back plate apertures are arranged in two rows of two apertures, one row directly above the other, and said film plate apertures are arranged in two horizontal rows of three apertures, one row of three apertures being directly above the other row of three apertures, whereby rotation of said lens turret and bidirectional movement of said film support plate in a predetermined fashion brings each of said film support plate apertures into registry with said lens during a six step exposure cycle.

4. The camera as recited in claim 1 further comprising switch and circuit means, means for connecting said switch and circuit means to a source of electrical current, a plurality of visually perceived camera status indication means mounted on said camera, a plurality of light signaling means associated with said status indication means, a control switch in said circuit means for operating a shutter in said camera and for energizing each of said light signalling means in a predetermined sequence, first motor means for stepwise rotation of said lens means, and second motor means for transversely moving said film support plate across the rear of said back support plate, the operation of both said motor means being governed from said control switch and controlled through said circuit means, whereby upon actuation of said control switch, only one of said motor means are actuated to bring each of said film support plate apertures into unobstructed registry with said single lens in a predetermined sequential manner.

5. The camera as recited in claim 3, further comprising switch and circuit means, means for connecting said switch and circuit means to a source of electrical current, a plurality of visually perceived, camera status indication means mounted on said camera, a plurality of light signalling means associated with said status indication means, a control switch in said circuit means for operating a shutter in said camera and for energizing each of said light signalling means in a predetermined sequence, first motor means for stepwise rotation of said lens means, and second motor means for transversely moving said film support plate across the rear of back support plate, the operation of both said motor means being governed from said control switch and further controlled through said circuit means, whereby upon actuation of said control switch, only one of said motor means are actuated to bring each of said film support plate apertures into unobstructed registry with said single lens in a predetermined sequential manner.

6. The camera as recited in claim 5 wherein said lens, when viewed from the front of the camera, is positionable at approximate 1:30 o'clock, 10:30 o'clock, 7:30 o'clock and 4:30 o'clock positions and said film support plate, when viewed from the rear of the camera, has its four lefthand film support plate apertures aligned with said four back plate apertures or its four righthand apertures aligned with said four back plate apertures, said control circuitry being arranged such that, with said lens in said 1:30 o'clock position and in unobstructed alignment with the uppermost lefthand one of said film support plate apertures, actuation of said control switch causes a first picture to be taken and said lens motor to rotate said lens into said 10:30 o'clock position in unobstructed alignment with the uppermost center of said film support plate apertures, a second actuation of said control switch causing a second picture to be taken and said film support plate motor to move the uppermost righthand film support plate aperture into unobstructed alignment with said lens, a third actuation of said control switch causing a third picture to be taken and said lens motor to rotate said lens to a 7:30 o'clock position into unobstructed alignment with the lower most righthand of said film support plate apertures, a fourth actuation of said control switch causing a fourth picture to be taken and said lens motor to rotate said lens to a 4:30 o'clock position into unobstructed alignment with the lowermost center of said film support plate apertures, a fifth actuation of said control switch causing a fifth picture to be taken and said film support plate motor to move the lowermost lefthand one of said film support plate apertures into unobstructed alignment of said lens, and a sixth actuation of said control switch causing a sixth picture to be taken and said lens motor to rotate said lens to said 1:30 o'clock position in unobstructed alignment with the uppermost lefthand one of said film support plate apertures, whereupon the fully exposed sheet of film may be replaced with an unexposed sheet of film, the camera being in condition to initiate another sequence of six pictures.

7. The camera as claimed in claim 6, said circuit means further including means for preventing double exposure of any individual area of a sheet of film supported on said film support plate.

8. The camera as recited in claim 6, wherein said plurality of visually perceived camera status indication means comprise a row of numbers from 1 to 6, the light signalling means associated with each number being sequentially lit to indicate to a camera operator that the camera is ready for taking the picture particularly denoted, by depressing of said control switch.

9. The camera as recited in claim 1, further comprising a plurality of cards, each card having indicia thereon which may be marked to be associated by a camera operator with said status indication means whereby each individual picture taken by said camera may be later affixed to an individual card with which it belongs.

10. The camera as recited in claim 1 further comprising aiming light means which produce a pencil beam of light aimed at a subject which is to be photographed, whereby a camera operator may properly align said camera and lens with a subject to be photographed.

11. The camera as recited in claim 1, further comprising means for manually rotating said lens turret, means for manually bidirectionally moving said film support plate transversely of said camera, circuit means, means for connecting said circuit means to a source of electric current, a plurality of visually perceived direction means mounted on said camera, a plurality of light signalling means associated with said direction means, and a control switch in said circuit with said direction means, and a control switch in said circuit means for operating a shutter in said camera and for energizing each of said light signalling means in a predetermined sequence, whereby upon actuation of said control switch, one of said signalling means is energized, thus to direct the operator of the camera to take a picture, rotate said lens turret or transversely move said film support plate.

12. The camera as recited in claim 3 further comprising means for manually rotating said lens turret, means for manually bi-directionally moving said film support plate transversely of said camera, circuit means, means for connecting such circuit means to a source of electric current, a plurality of visually perceived direction means mounted on said camera, a plurality of light signalling means associated with said direction means, and a control switch in said circuit means for operating a shutter in said camera and for energizing each of said light signalling means in a predetermined sequence, whereby on actuation of said control switch, one of said signaling means is energized, thus to direct the operator of the camera to take a picture, rotate said lens turret, or transversely move said film support plate.

13. The camera as recited in claim 12 wherein said lens, when viewed from the front of the camera, is positionable at approximate 1:30 o'clock, 10:30 o'clock, 7:30 o'clock and 4:30 o'clock and said film support plate when viewed from the rear of the camera, has its four lefthand apertures aligned with said four back plate apertures or its four righthand apertures aligned with said four back plate apertures, said direction and light signalling means including "ready" indicia and a first light, indicating that a picture may be taken, "move back" indicia and a second light indicating that the film support plate is to be moved transversely across the rear of the camera and "move lens" indicia and a third light, indicating that the lens is to be rotated 90° to a new position, said circuitry means arranged such that, with said lens in 1:30 o'clock position and in unobstructed alignment with uppermost lefthand one of said film support plate apertures and said first light being lit, actuation of said control switch causes a first picture to be taken, said first light to turn off and said second light to be lit, whereby after manual movement of said film support plate to align the uppermost center of said film support plate apertures with said lens, said second light is turned off and said first light is lit, a second actuation of said control switch causing a second picture to be taken, said first light to turn off and said third light to be lit whereby after manual rotation of said lens to said 1:30 o'clock position to align the uppermost righthand one of said film support plate apertures with said lens, said third light is turned off and said first light is lit, a third actuation of said control switch causing a third picture to be taken, said first light to turn off and said third light to be lit, whereby after manual rotation of said lens to said 4:30 o'clock to align the lowermost righthand one of said film support plate apertures with said lens, said third light is turned off and said first light is lit, a fourth actuation of said control switch causing a fourth picture to be taken, said first light to turn off and said third light to be lit whereby after manual rotation of said lens to 4:30 o'clock position to align the lowermost center of said film support plate apertures with said lens, said third light is turned off and said first light is lit, a fifth actuation of said control switch causing a fifth picture to be taken, said first light to turn off and said second light to be lit whereby after manual movement of said film support plate to align the lowermost lefthand of said film support plate apertures, said second light is turned off and said first light is lit, a sixth actuation of said control switch causing a sixth picture to be taken, said first light to be turned off and said third light to be lit, whereby upon rotation of said lens to said 1:30 o'clock position, a fully exposed sheet of film may be replaced with an unexposed sheet of film, the camera being in condition to initiate another sequence of six pictures.

14. The camera as recited in claim 13 wherein said direction and light signalling means further include "pull film" indicia and a fourth light, said circuitry being further arranged such that, upon said sixth actuation of said control switch, said fourth light is lit, thus indicating to a camera operator to remove the fully exposed sheet of film.

15. The camera as recited in claim 13 further comprising means in said circuit means for preventing the double exposure of film through any one of said film support plate apertures, after actuation of said control means and prior to undertaking the step mandated by said direction and light signalling means.

16. The camera as recited in claim 11 further comprising a plurality of cards, each card having indicia thereon which may be marked to be associated by a camera operator with the sheet of film being exposed through said film support plate aperture means whereby each individual picture taken by said camera may be later affixed to an individual card with which it belongs.

17. The camera as recited in claim 11 further comprising an aiming light which produces a pencil beam of light aimed at a subject which is to be photographed, for proper alignment of said camera and lens with a subject.

* * * * *